US006561688B2

(12) United States Patent
Albou

(10) Patent No.: US 6,561,688 B2
(45) Date of Patent: May 13, 2003

(54) ELLIPTICAL HEADLIGHTS FOR MOTOR VEHICLES

(75) Inventor: Pierre Albou, Bobigny (FR)

(73) Assignee: Valeo Vision, Bobigny Cedex (FR)

(*) Notice: Subject to any disclaimer, the term of this patent is extended or adjusted under 35 U.S.C. 154(b) by 0 days.

(21) Appl. No.: 09/899,337

(22) Filed: Jul. 5, 2001

(65) Prior Publication Data

US 2002/0003709 A1 Jan. 10, 2002

(30) Foreign Application Priority Data

Jul. 7, 2000 (FR) .......................................... 00 08903

(51) Int. Cl.[7] ................................................ B60Q 1/00
(52) U.S. Cl. ....................... 362/539; 362/303; 362/519
(58) Field of Search ............................... 362/538, 539, 362/517, 519, 303, 282, 283, 284

(56) References Cited

U.S. PATENT DOCUMENTS

| | | | | |
|---|---|---|---|---|
| 1,614,027 A | | 1/1927 | Graf | |
| 5,285,358 A | | 2/1994 | Watanabe et al. | 362/61 |
| 5,461,553 A | * | 10/1995 | Neumann et al. | 362/305 |
| 5,526,248 A | * | 6/1996 | Endo | 362/297 |
| 5,544,021 A | * | 8/1996 | Lopez et al. | 362/211 |
| 5,938,323 A | * | 8/1999 | McMahan | 362/517 |
| 6,250,790 B1 | * | 6/2001 | Montet | 362/507 |
| 6,280,067 B1 | * | 8/2001 | Albou | 362/282 |

FOREIGN PATENT DOCUMENTS

| | | |
|---|---|---|
| EP | 1 031 785 | 8/2000 |
| FR | 2 135 432 | 12/1972 |
| FR | 2 627 845 | 9/1989 |

* cited by examiner

*Primary Examiner*—Sandra O'Shea
*Assistant Examiner*—John Anthony Ward
(74) *Attorney, Agent, or Firm*—Morgan & Finnegan, LLP

(57) ABSTRACT

An elliptical projector for a motor vehicle comprises an ellipsoidal reflector co-operating with a light source mounted in a first focal region of the reflector, which forms, in a second focal region, a concentrated patch of light after reflection. The headlight also has a convergent lens which is focused in the vicinity of the second focal region so as to project this light patch on the road. The headlight further includes a mask in the path of the light between the light source and the lens. The mask is adapted to occult part of the light flowing between the reflector and the lens, and is disposed entirely above the second focal region of the reflector; the mask defines at least two occulting regions which are spaced apart in the direction of the optical axis; and each occulting region is arranged to mask a specific portion of the light. The invention is applicable, in particular, to the production of a main beam with a blurred, achromatic, cut-off at the bottom; this beam may be autonomous, or it may be complementary to a dipped or passing beam.

24 Claims, 14 Drawing Sheets

ELLIPTICAL HEADLIGHTS FOR MOTOR VEHICLES

FIELD OF THE INVENTION

The present invention relates in general terms to headlights of the so-called elliptical type for motor vehicles, and in particular a headlight of this type which is designed to produce a main beam.

BACKGROUND OF THE INVENTION

An elliptical headlight comprises, mainly, a recuperating and concentrating reflector which is in the form of an ellipsoid and which has a first focal region in which a light source is placed, and a second focal region. The light source is for example the filament of an incandescent lamp or the arc of a discharge lamp, and the second focal region of the reflector is such that light issued from the light source, after being reflected on the reflector, forms in the second focal region a patch of concentrated light. Such a headlight also includes a convergent lens, which is typically of the planar-convex type, which is focused in the vicinity of the second focal region of the reflector and which is capable of projecting on the road the above mentioned light patch.

A headlight of the above type lends itself well to the production of a beam which is delimited by a top cut-off line, for example a dipped beam. For this purpose, a mask is arranged in the region of the light patch for partly masking (obscuring or occulting) the patch, so that the upper edge of the mask defines the required cut-off line in the beam projected forward from the vehicle.

Attempts have also been made to make use of a headlight of the above type to give a main beam, that is to say a beam which has a point of concentration in the axis of the road, but which also has a certain degree of width and a certain degree of thickness, for example a long-range driving beam. This requirement is not readily satisfied by a headlight of the above type, and the reasons for this will be explained below.

In the first place, because of the large quantity of light required on the axis of the road, the use of a reflector which has a comparatively large lamp hole in its base, for fitting the lamp in the reflector, poses a problem. In this connection, the presence of this lamp hole causes a dark zone, corresponding to the image of the lamp hole, to occur in the projected beam, since naturally the lamp hole recuperates no light.

In fact, in order to obtain the greatest possible amount of light in the axis of the road, it is desirable to have a front surface of the lens which is as large as possible with respect to the surface of the lamp hole. This becomes more difficult to achieve as, in general, there is a requirement to give the headlight a reduced height and width, and therefore to have a lens which is as small as possible. This small lens is one of the most significant advantages of this headlight technology, especially from the point of view of styling.

It is of course possible to try and reduce the size of the lamp hole, given that the means for fitting the lamp to the headlight are usually arranged at the level of the lamp base, so that the lamp hole has to have a large surface area.

One solution for reducing the size of the lamp hole consists in mounting the lamp further back in the general direction of emission of the light, so that only its bulb has to pass through the lamp hole, with the lamp base situated behind the hole. As a result, the size of the lamp hole can be reduced, even if a safety distance has to be provided around the bulb of the lamp for preventing undesirable heating of the reflector in that region.

It will be understood that the two problems set forth above lead to the focal distance of the reflector being short. In this connection, a short focal distance is the direct consequence, firstly, of minimising the lateral and vertical size of the headlight, and secondly, of the above mentioned retraction of the lamp with respect to the reflector, bringing the light source further back in the reflector.

This short focal distance causes the reflector to produce a concentrated light patch of considerable size because the light source is not a point. Typically, the light source is a cylinder of about 5 mm long and about 1 mm diameter.

One example of the appearance of the beam corresponding to the projection of this patch on the road is shown in FIG. 1 of the accompanying drawings. It will be understood that such a beam, because of its significant extent vertically below the axis of the road, will light the road very close to the vehicle, while being significantly uncomfortable visually in the distance.

One solution to overcome this disadvantage could consist in providing, in the region of the light patch before the latter is projected, a mask similar to those which are used in dipped or passing beams, but in a turned back position such that it will occult the light which illuminates the road too close to the vehicle. However, this solution would not be satisfactory from the point of view of the visual comfort of the driver, because it would lead to very high contrast at the level of an imaginary line situated on the road in front of the vehicle. In addition, this contrast would be detrimental to the use of the beam both as a plain main beam (i.e. one where the dipped or passing beam is extinguished), and as a main beam complementary to the dipped or passing beam which in that situation remains illuminated.

DISCUSSION OF THE INVENTION

An object of the present invention is to overcome the above mentioned drawbacks and limitations in the present state of the art.

More precisely, the invention aims to propose means which are capable of ensuring progressive reduction of the amount of light, to the extent that this light illuminates zones of the road closer and closer to the vehicle.

Another object of the invention is to obtain this objective without giving rise to undesirable colouring effects in the light due to chromatic variations in the angles of refraction by the lens according to the wavelength of the light. In particular, the present invention aims to make use of the effects of masking the light at a distance from the focal surface of the lens. This focal surface would be a plane in a perfect lens, but for an imperfect lens such as a planar-spherical lens, it will be a sort of dome, the focus of which constitutes the apex. However, the invention also aims to ensure that, in spite of such defocalising of the mask, no undesirable colouring effects, i.e. the chromatic effects mentioned above, will be produced in the beam.

According to the invention, a headlight of the elliptical type for a motor vehicle, including a recuperating and concentrating reflector of the ellipsoidal type having a first focal region in which a light source is placed, and a second focal region in which a patch of concentrated light is formed after reflection of the light from the source by the reflector, and further including a convergent lens which is focused in the vicinity of the second focal region of the reflector, and which is capable of projecting the said patch of concentrated light on the road, the reflector and the lens defining an optical axis of the headlight, is characterised in that it further includes a mask adapted to obscure a part of the light passing between the reflector and the lens, being disposed entirely above the said second focal region and having at least two occulting regions which are spaced apart in the direction of the said optical axis, and each of which is adapted to obscure, simultaneously, a specific part of the light.

Further features of the invention, which are preferred but not limiting, and which may be applied to the invention alone or in any practicable combination, are as follows:

each of the said spaced-apart occulting regions defines a sharp edge;

each of the said spaced-apart occulting regions defines a curved edge;

the said spaced-apart occulting regions define a sharp edge and a curved edge respectively;

the two edges are at the same height;

the edges are at different heights;

a front edge is situated lower down than the rear edge;

one of the edges is situated substantially directly below a focus of the lens;

the edge situated substantially directly below the focus of the lens is the front edge;

the edges are situated behind and in front of the focus of the lens in the direction of the optical axis, respectively;

the edges are situated at substantially equal distances from the focus of the lens in the direction of the optical axis;

the mask has a third occulting region intermediate between the first and second occulting regions;

the said intermediate occulting region defines a sharp edge;

the said intermediate occulting region defines a rounded edge;

the edge defined by the said third intermediate occulting region is at substantially the same height as one of the said first and second occulting regions;

the edge formed by the said third intermediate occulting region is lower down than each of the said two occulting regions;

the mask extends in a direction which is generally horizontal and transverse to the optical axis, and has the same vertical cross section over its whole length;

the mask extends in a general direction which is horizontal and transverse to the optical axis, and has a vertical cross section which varies along its length;

the mask is made of bent sheet metal;

it is an autonomous main-beam headlight;

it is a main-beam headlight with a complementary dipped-beam headlight.

Further features and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 2:
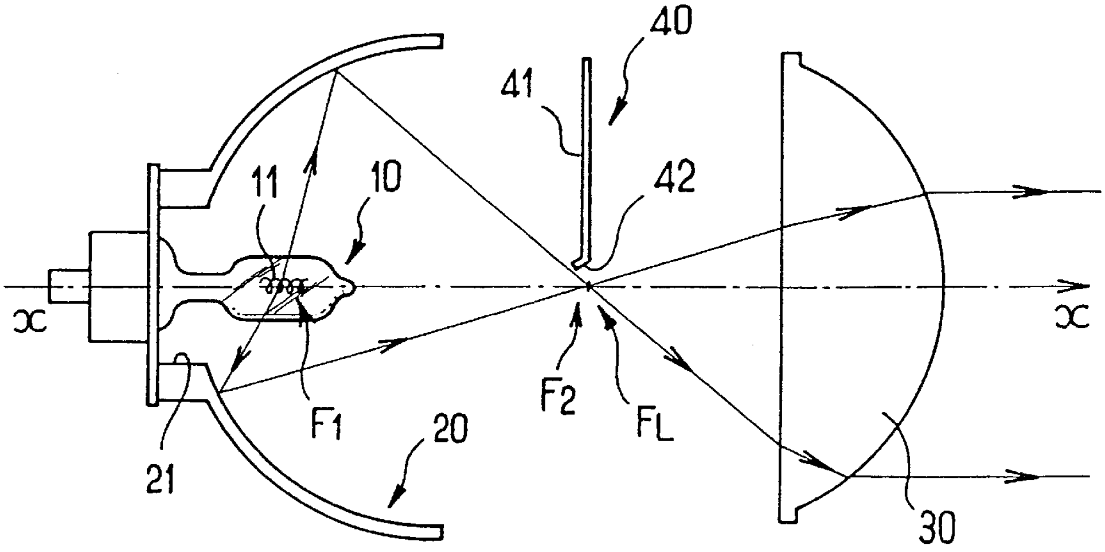
FIG. 2 is a diagrammatic view in vertical axial cross section of the essential components of a headlight of the elliptical type according to the invention.

Reference is first made to FIG. 2, which shows diagrammatically a headlight which comprises, in the known way, a lamp 10 that provides the light source, which in this case is its incandescent filament 11. The lamp is mounted in a base hole 21 of an elliptical reflector 20, the form of which is an ellipsoid of revolution. The filament 11 is disposed in a first focal region F1 of the reflector, so as to generate a light patch in the second focal region F2 of the latter.

Figure 1:
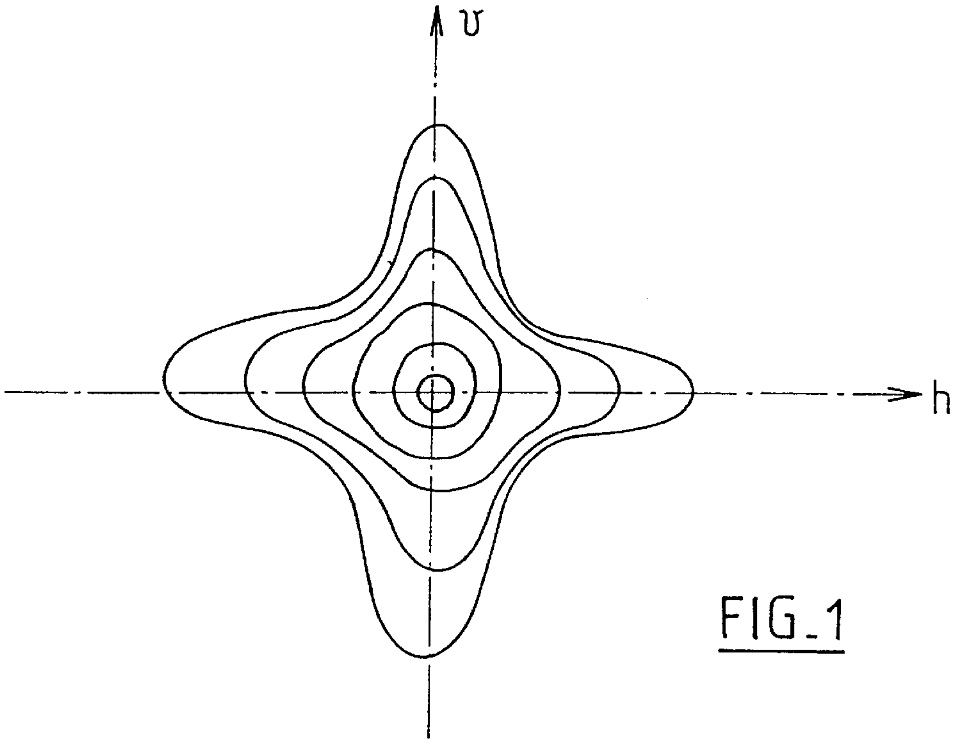
FIG. 1, which has already been described above, is a diagram consisting of a set of isolux curves showing the appearance of a patch of light produced by a headlight of the elliptical type having an ellipsoidal reflector with a short focal length, and without any mask.

The headlight also includes a lens 30, which in this example is a planar-convex lens, the axis of which is coincident with the major axis of the reflector passing through the first and second focal regions. This axis, x—x, will be referred to in the remainder of this description as the optical axis of the headlight. The focus FL of the lens 30 projects the light patch present in the region F2 to infinity on the road, in the manner described earlier herein with reference to FIG. 1.

The headlight further includes a specific mask 40 which is located above the horizontal plane passing through the optical axis x—x, and having the property of possessing at least two active edges for selectively obscuring (masking, occulting) certain components of the light coming from the reflector. This is by contrast with conventional masks used in dipped beam headlights which extend generally vertically and which only have one optically active edge, namely the upper edge.

Figure 3:
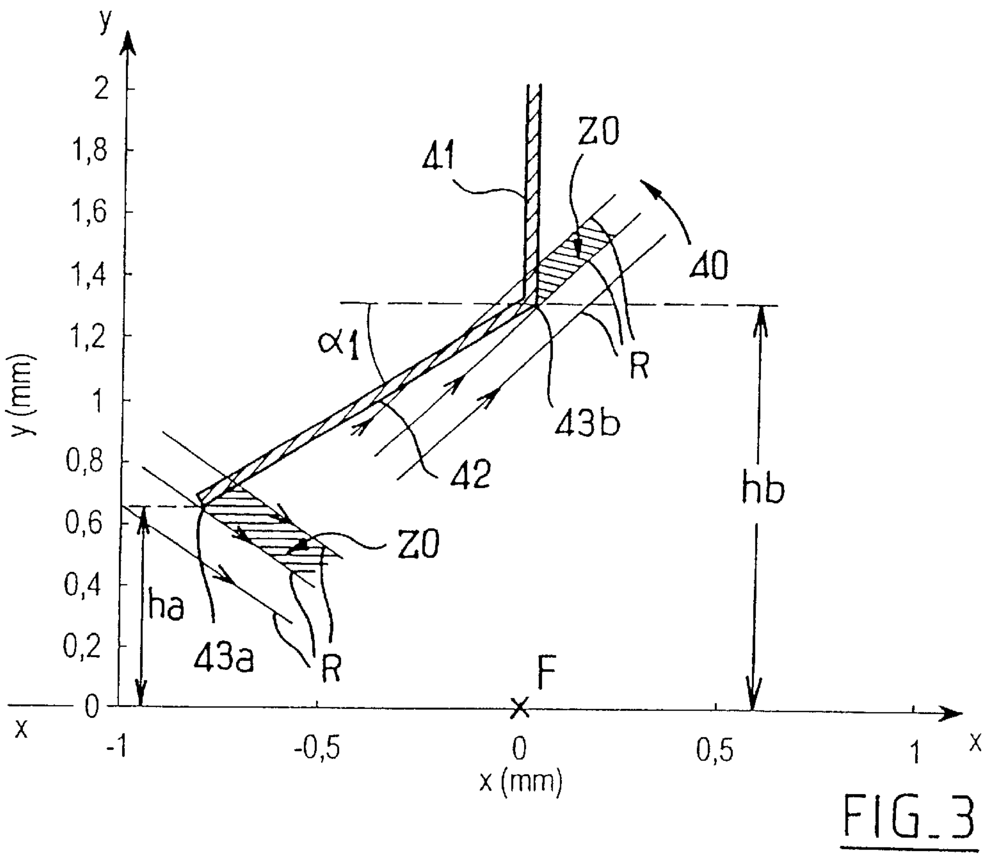
FIG. 3 is a vertical axial cross section of the headlight showing a first version of a mask for the headlight of FIG. 1.

Reference is now made to FIG. 3 showing the first version of this mask. It includes a riser 41 which has an occulting function where appropriate. However, its main function is to secure the working part of the mask mechanically on the structure of the headlight, for example through an intermediate member of the light, which will not be described here as it is of well known conventional form, and which secures the reflector and lens together. In another version, the mask 40 may be made integrally with that intermediate member.

In FIG. 3, the mask 40 also includes an oblique occulting portion 42 which extends downwardly and rearwardly in the headlight from a front edge 43*b* situated directly below the point F, which also constitutes the second focus F2 of the reflector 20 and the focus FL of the lens. The portion 42 extends towards a rear edge 43*a*. It should be noted that in this description, expressions such as "front" and "rear" or "forward" and "backward" always relate to the general direction in which light is emitted by the headlight, defined by the optical axis x—x.

It will also be observed that the two edges 43*a* and 43*b* are spaced apart along the optical axis itself.

In this embodiment, and indeed for preference in all of the other embodiments yet to be described herein, the occulting portion of the mask is a profiled element extending horizontally and transversely with respect to the optical axis, that is to say the edges 43*a* and 43*b* are themselves horizontal and parallel to that axis.

FIG. 3 shows lines representing a set of light rays R, which illustrate that the two edges 43*a* and 43*b* of the occulting portion 42 have two autonomous functions in respect of the light radiation produced. The rear edge 43*a* has an occulting effect, producing a shadow zone Z0, at a level which is determined for descending rays, while the front edge 43*b* has an occulting effect, to give another shadow zone Z0 at a level which is determined for rising rays.

This novel form of mask has been designed mainly in order to give progressive attenuation of the light. More precisely, given that there is a variety of light rays, rising or descending, which participate in the formation of the light at a given level within the beam, the mask occults the light progressively by acting differently on the ascending and descending rays.

Figure 4:
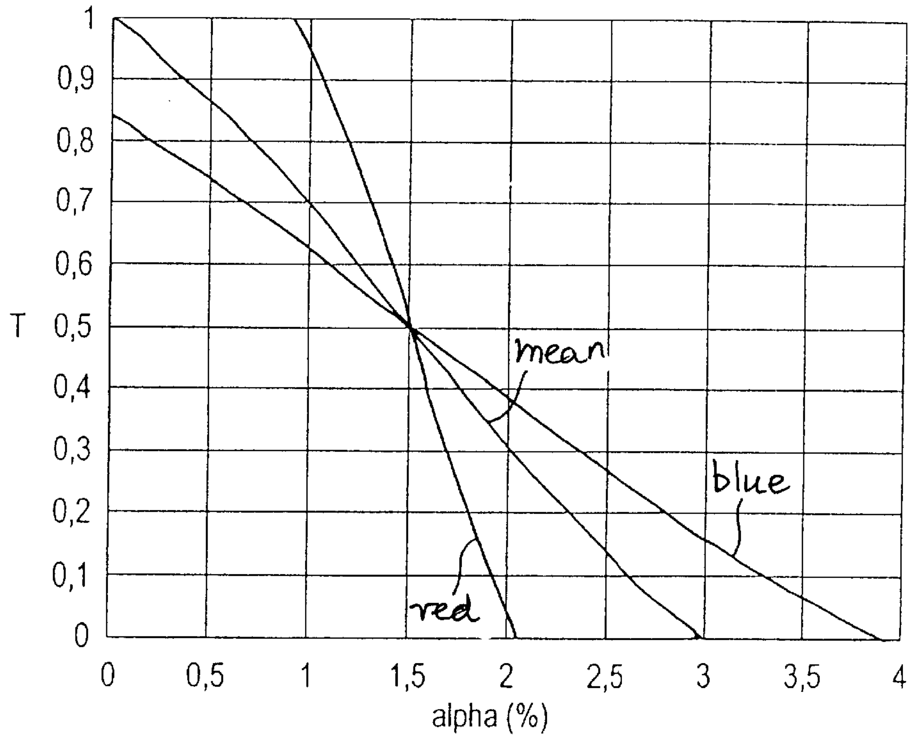
FIG. 4 shows one aspect of the optical behaviour of a light having the mask shown in FIG. 3.

Thus, FIG. 4 is a graph in which the abscissa shows the downward slope (alpha) of the light, in which 0° corresponds to the horizon. The values indicated on the abscissa correspond to the inclination of the light below the horizon. The ordinate indicates the proportion T of light transmitted on exit from the lens 30 of the light, as a function of the above mentioned inclination. This proportion is represented on a scale from 0 to 1 in which 1 indicates that all of the light is passing and 0 indicates that none is passing.

On this basis, FIG. 4 shows three curves which represent the optical behaviour, in terms of the relationship between T and the inclination alpha, of the assembly consisting of the reflector, mask and lens, for red light, blue light, and the mean of these two.

It will be noted that for the mean value, and also for the red and blue light, attenuation of the light as a function of its downward inclination varies progressively, the curve being oblique in each case. This reveals blurred cut-off of the light due to the mask being out of focus.

It will be understood here that, in the embodiment shown in FIG. 3, it is the position of the edges 43*a* and 43*b* that is important, while the mask may take any form whatever between these two edges, because here it is not acting on the occulting profile. Thus for example, a mask 42 may be provided that has a cross section in the form of a circular arc, or a triangle, or any other form, such that this cross section extends for example above the straight segment joining the edges 43*a* and 43*b* so as not to influence the masking effect produced.

Figure 5:
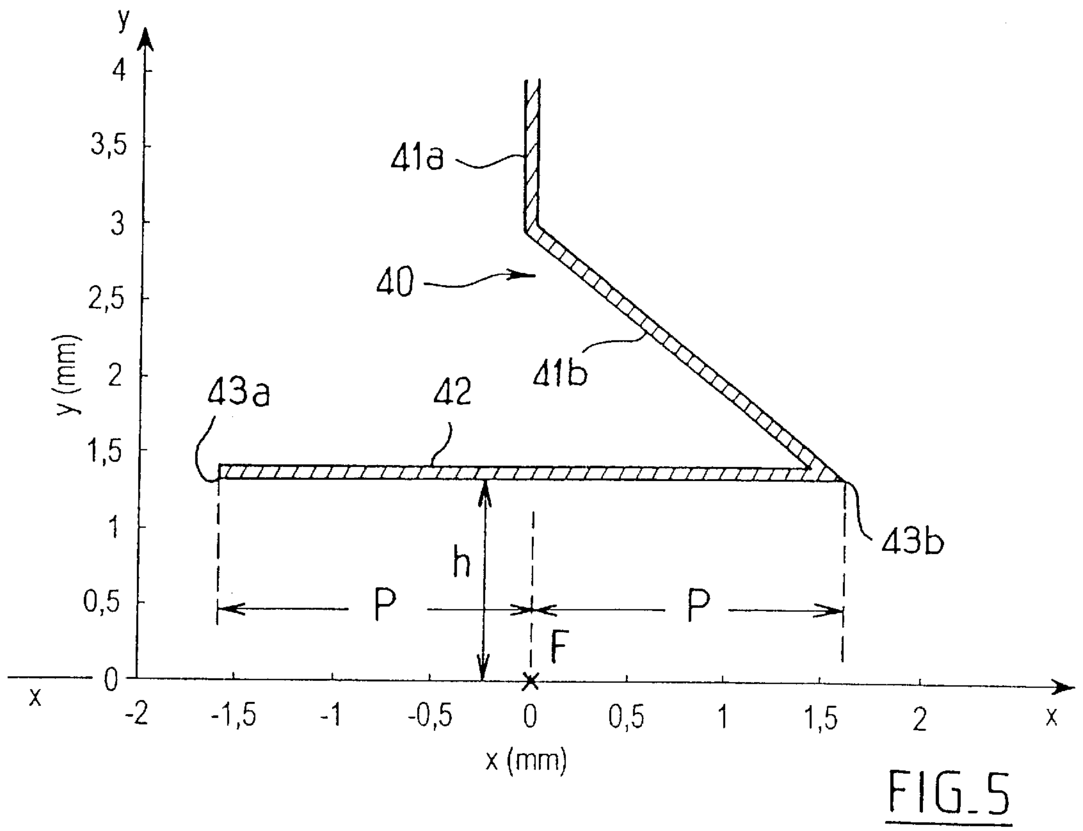
FIG. 5 shows a second version of a mask according to the invention.

Reference is now made to FIG. 5 showing the second embodiment of the invention, which is designed to reduce chromatic effects, especially in the lower part of the beam. In this connection, it will be noted that, when the attenuation curves for the different colours (red and blue in this case) are significantly spaced away from each other, they can give rise to colouring of the beam. Whereas, along the driving axis (0°), significant differences in attenuation by colour will hardly be visible to the driver because lighting effect extends into the distance, such differences may be undesirable in the lower region of the beam, because they will lead to perceptible colouration in the part of the beam which illuminates the road closest to the vehicle.

The mask 40 in FIG. 5 has a generally horizontal occulting portion 42 which lies below the focus F, and has a first edge 43*a* situated behind the focus F, so that its second edge 43*b* is in front of that focus.

The mask is secured mechanically in the headlight in any suitable way, for example by giving it a riser which is bent into two portions 41*a*, 41*b*, though any other form may be used which has no effect on the occulting profile.

Figure 6:
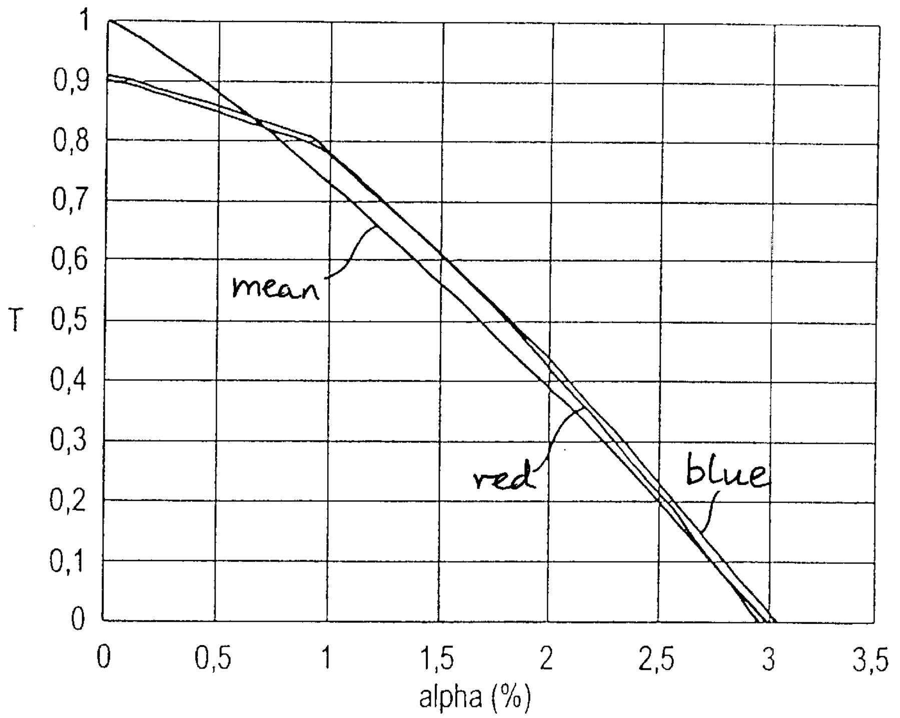
FIG. 6 shows one aspect of the optical behaviour of a headlight having the mask shown in FIG. 5.

This form of mask is found to limit chromatic effects very well. Thus, FIG. 6 shows the three attenuation curves, for red, blue and mean light, which are extremely close to each other over the whole angular extent of the blurred cut-off, and especially in the region of the horizon, so that no chromatic effect is in practice perceived by the driver along the driving axis.

Figure 7:
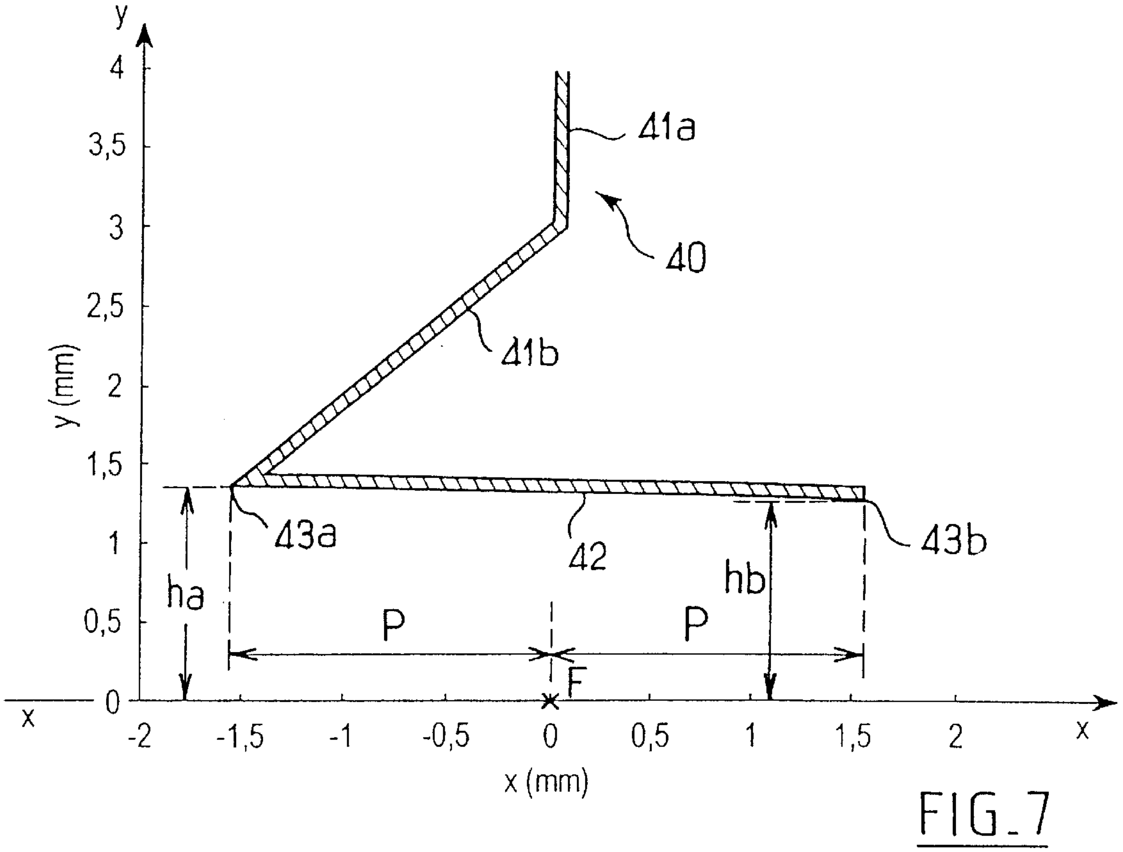
FIG. 7 shows a third version of a headlight mask according to the invention.
Figure 8:
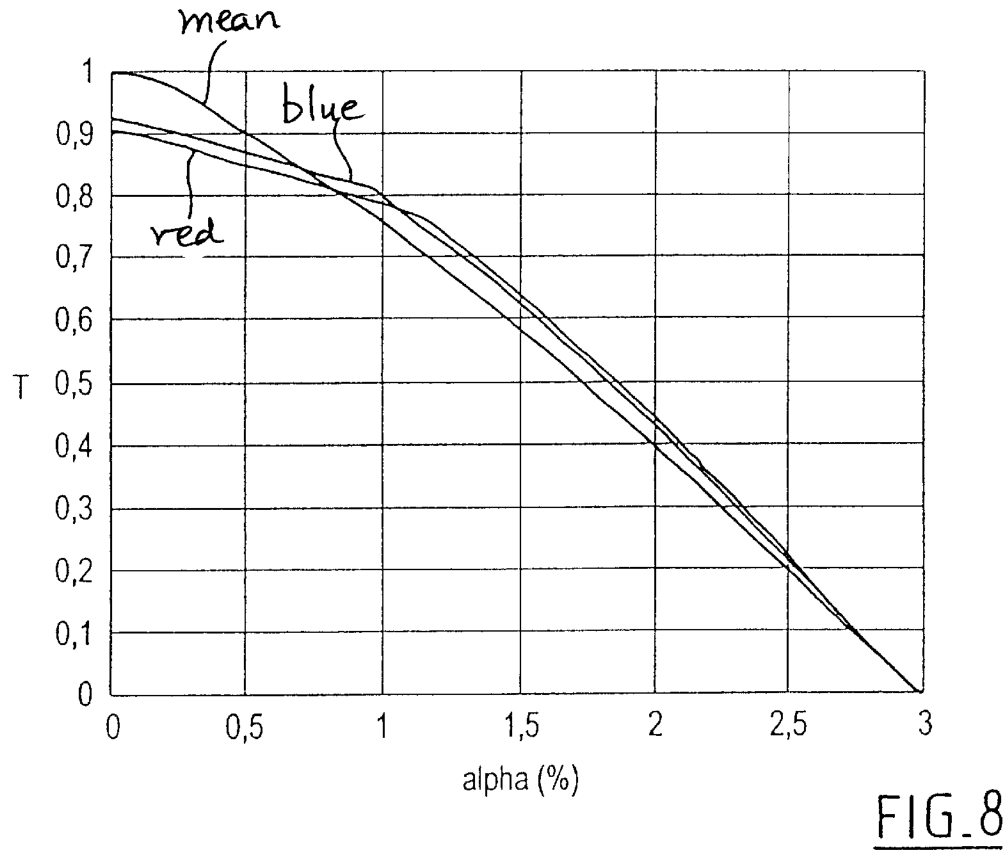
FIG. 8 shows one aspect of the optical behaviour of a headlight equipped with the mask shown in FIG. 7.

Reference will now be made to FIGS. 7 and 8 showing the third embodiment of the invention. This is distinguished from that in FIG. 5 mainly in that the mask 42 has a very slight downward and forward inclination with respect to the horizontal plane passing through the optical axis x—x. As can be seen from FIG. 8, the corresponding optical behaviour of this mask in terms of progressive attenuation shows a result similar to that in FIG. 6, but better in that, for a downward inclination of 3°, the red and blue curves are completely coincident.

Figure 9:
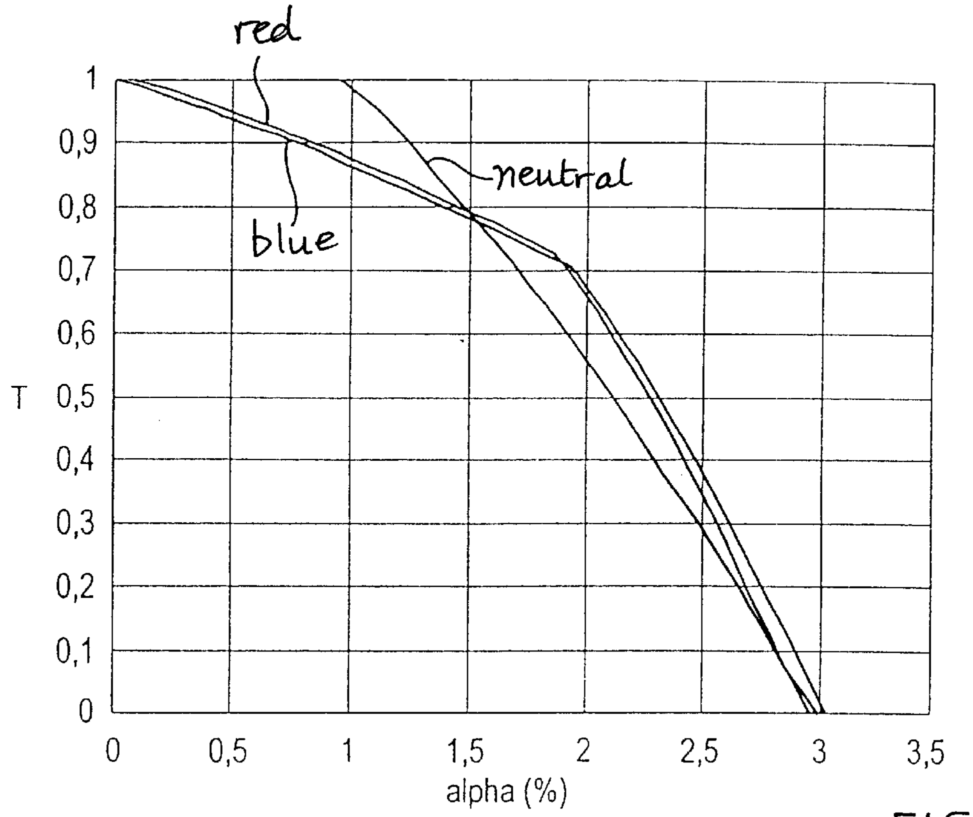
FIGS. 9 and 10 show one aspect of the optical behaviour of a headlight equipped with a mask similar to that shown in FIG. 5 or FIG. 7, respectively, but with forms or dimensions which are slightly different.
Figure 10:
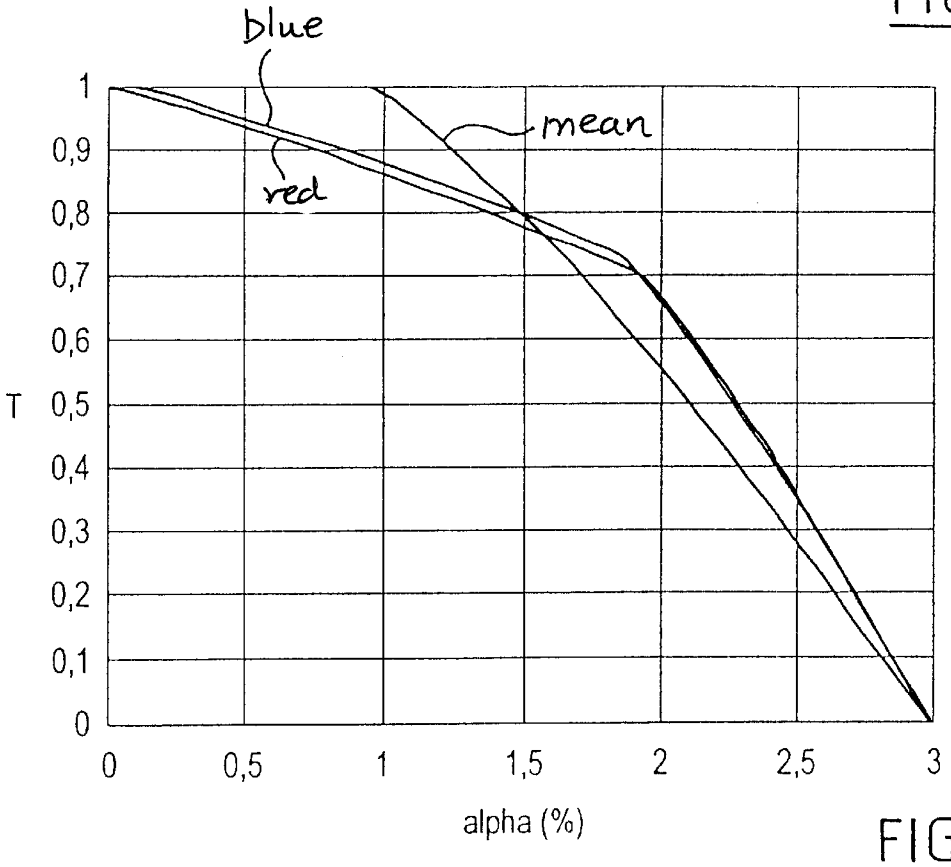

Reference is now made to FIGS. 9 and 10, which show the optical behaviour, in attenuation terms, for different dimensions of the masks in FIGS. 5 and 7 respectively. It will be noted that this shows that it is possible to adjust the angle at which attenuation starts (which is 0° in this example), so as to leave a greater amount of light in the driving axis.

Figure 11:
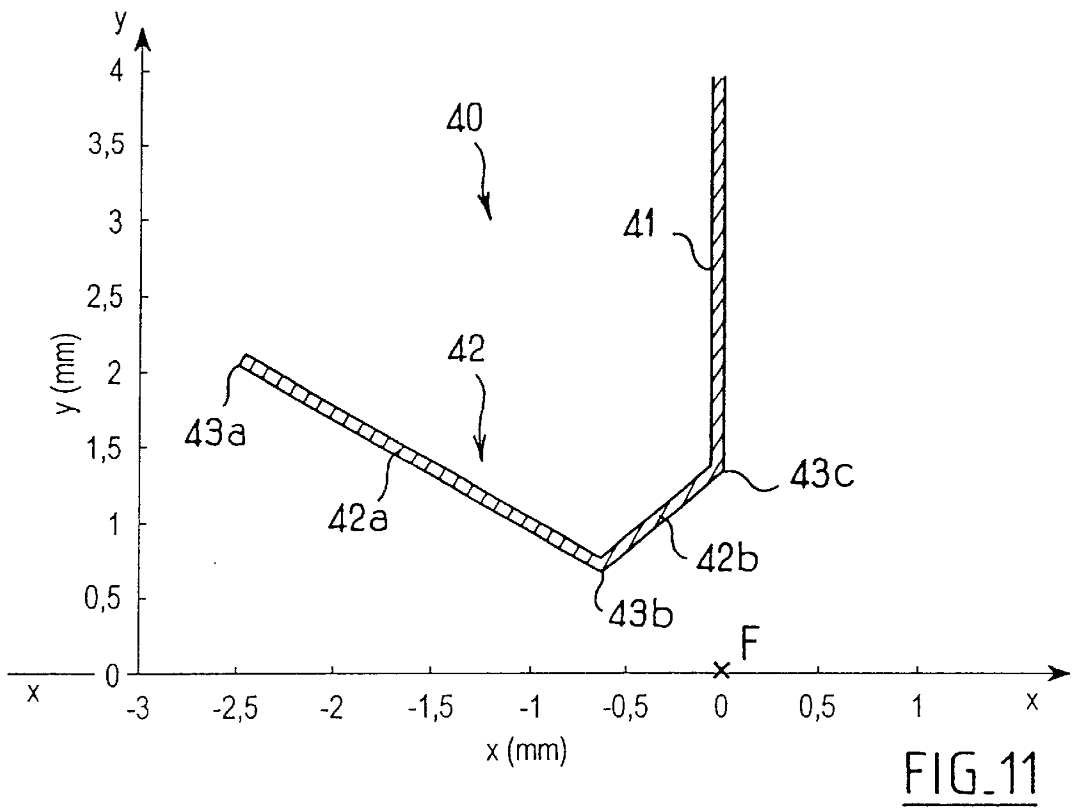
FIG. 11 shows a fourth version of a headlight mask according to the invention.

The fourth embodiment to be described here is shown in FIG. 11, in which the occulting portion 42 of the mask is characterised by three working edges 43*a*, 43*b* and 43*c*. More precisely, the mask overall is in the form of an asymmetrical V, with a top rear edge 43*a*, a bottom intermediate edge 43*b*, and a top front edge 43*c*. These edges are joined together in this case by portions 42*a* and 42*b* with straight transverse cross sections. The front edge 43*c* in this example is directly below the focus F, and the whole of the occulting portion 42 extends towards the rear from that focus.

It will be understood that the rear edge 43*a* acts on the radiation which is more inclined downwards than the portion 42*a,* and that the front edge 43*c* acts on the radiation which is more inclined upwards than the portion 42*b.* It will also be understood, finally, that the intermediate edge 43*b* acts on the radiation which has an intermediate inclination between those extreme inclinations.

Figure 12:
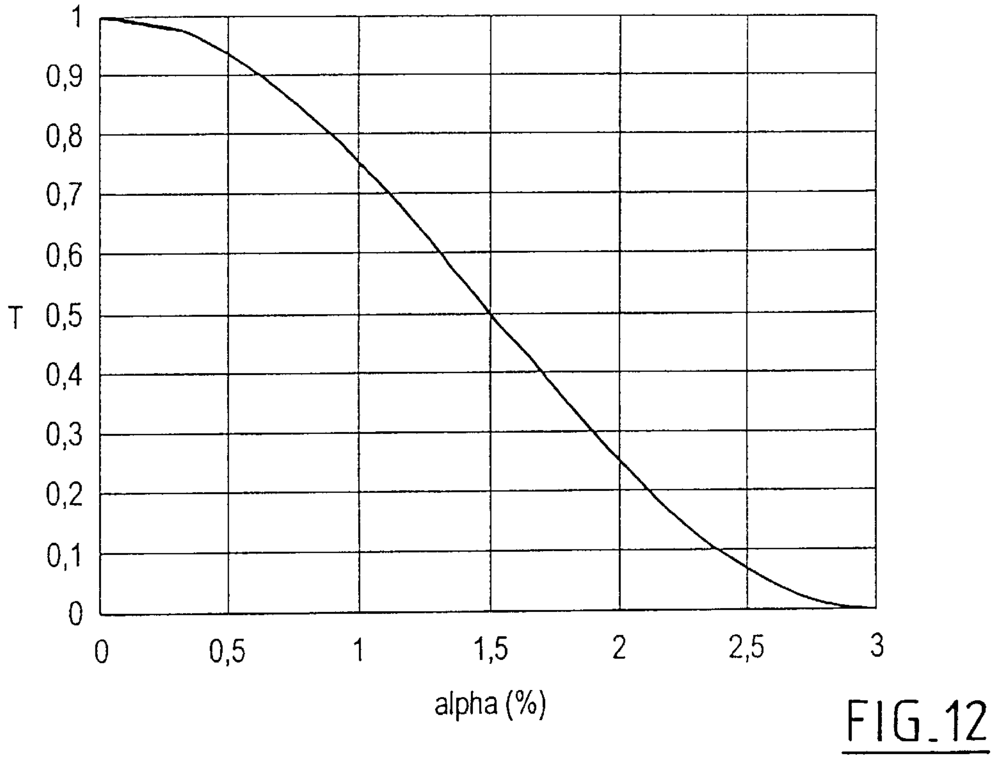
FIG. 12 shows the general appearance of the optical behaviour of a headlight having the mask shown in FIG. 11.
Figure 13:
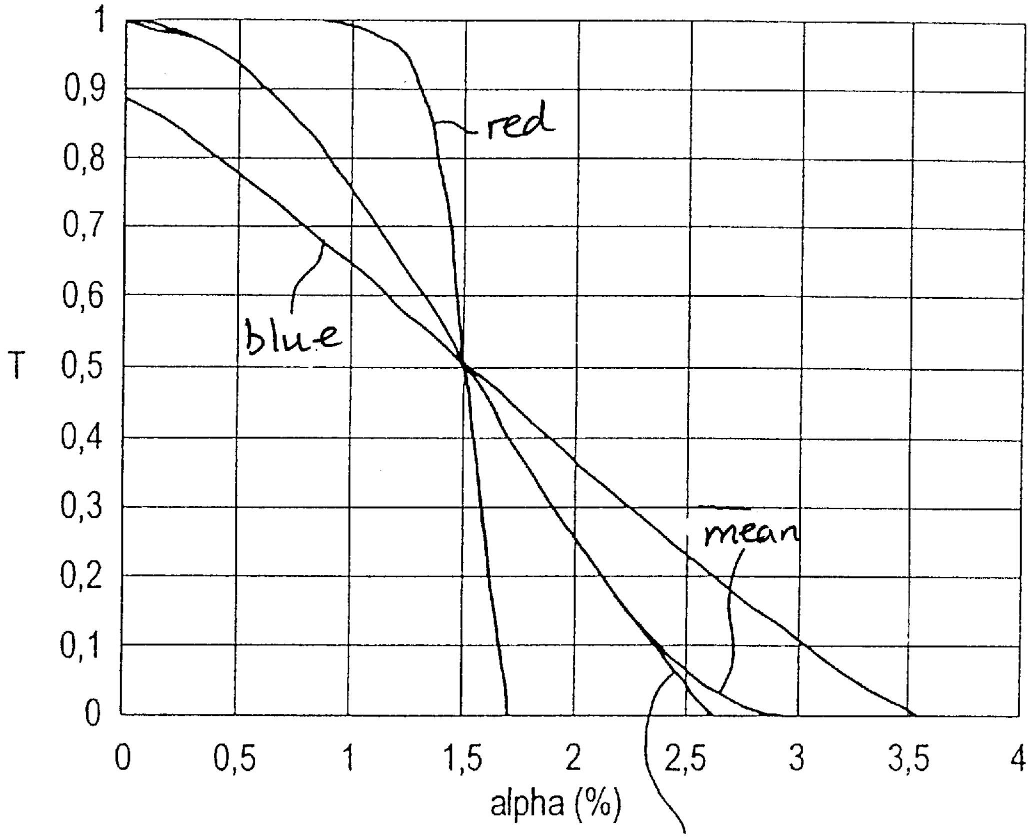
FIG. 13 shows a detailed aspect of the optical behaviour generally shown in FIG. 12.

As is illustrated by FIGS. 12 and 13, this approach produces a quasi-sinusoidal attenuation relationship, and therefore excellent progressivity of the blurring of the cut-off.

Figure 14:
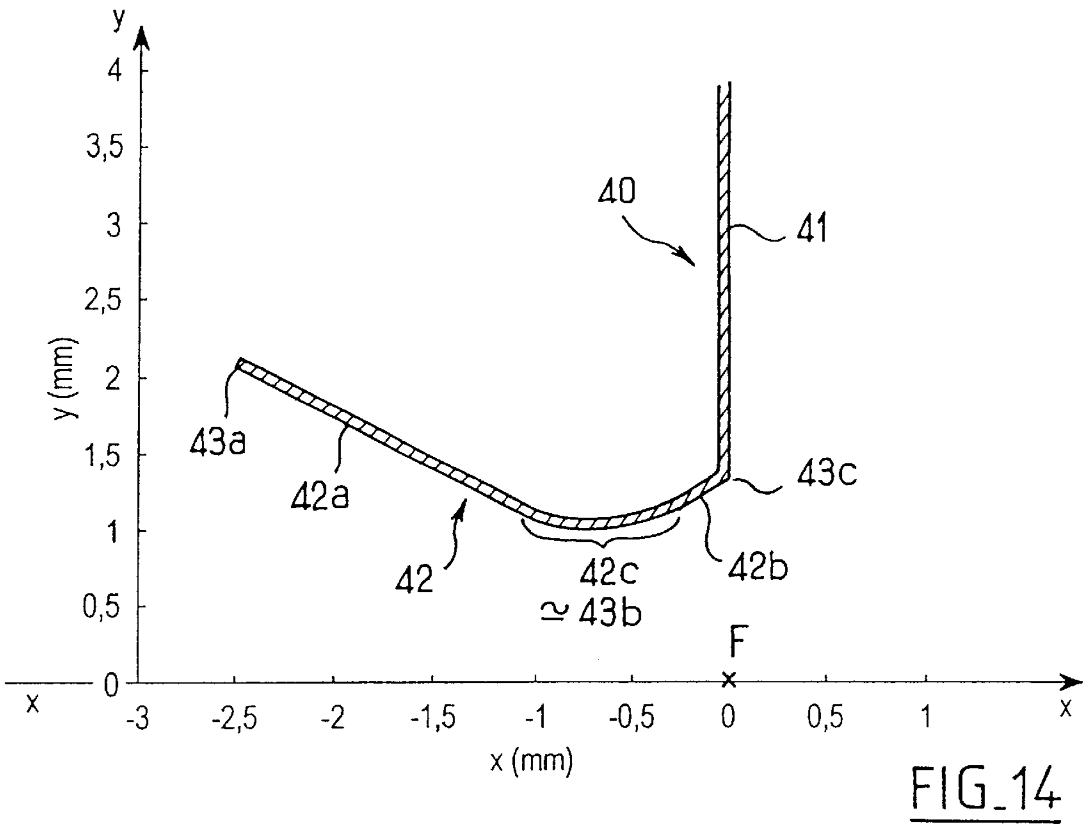
FIG. 14 shows a fifth version of a headlight mask according to the invention.

Reference is now made to the fifth version of the mask according to the invention, shown in FIG. 14. This is similar to the one in FIG. 11, but it differs in that the portions 42*a* and 42*b* of the occulting portion of the mask are joined not at the level of a free edge 43*b,* but at the level of a gentle curved transition represented by the zone 42*c,* which is for example of circular arcuate cross section.

It will be understood that the edges 43*a* and 43*c* work in the same way as before, but that the edge 43*b* is replaced by the zone 42*c,* which in practice represents an infinite number of occulting edges 43*b* which are variable in accordance with the inclination of the neighbouring light. In particular, the low point of the zone 42*c* constitutes an occulting edge with respect to horizontally propagated radiation.

Figure 15:
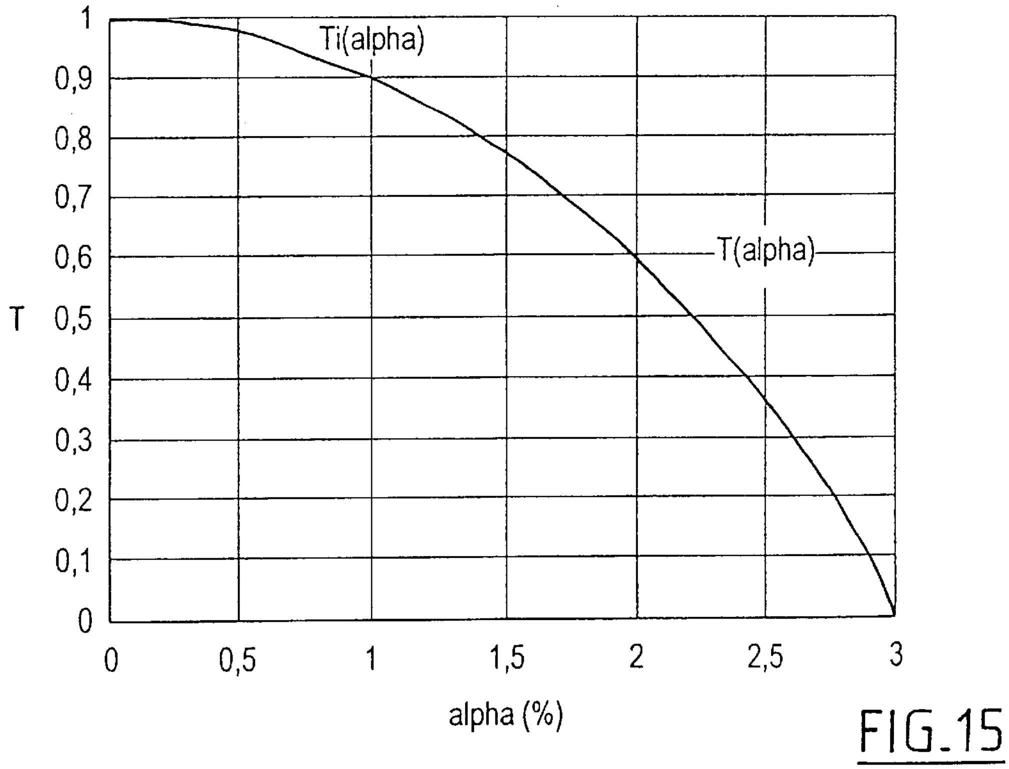
FIG. 15 shows the general optical behaviour of a headlight having the mask shown in FIG. 14.
Figure 16:
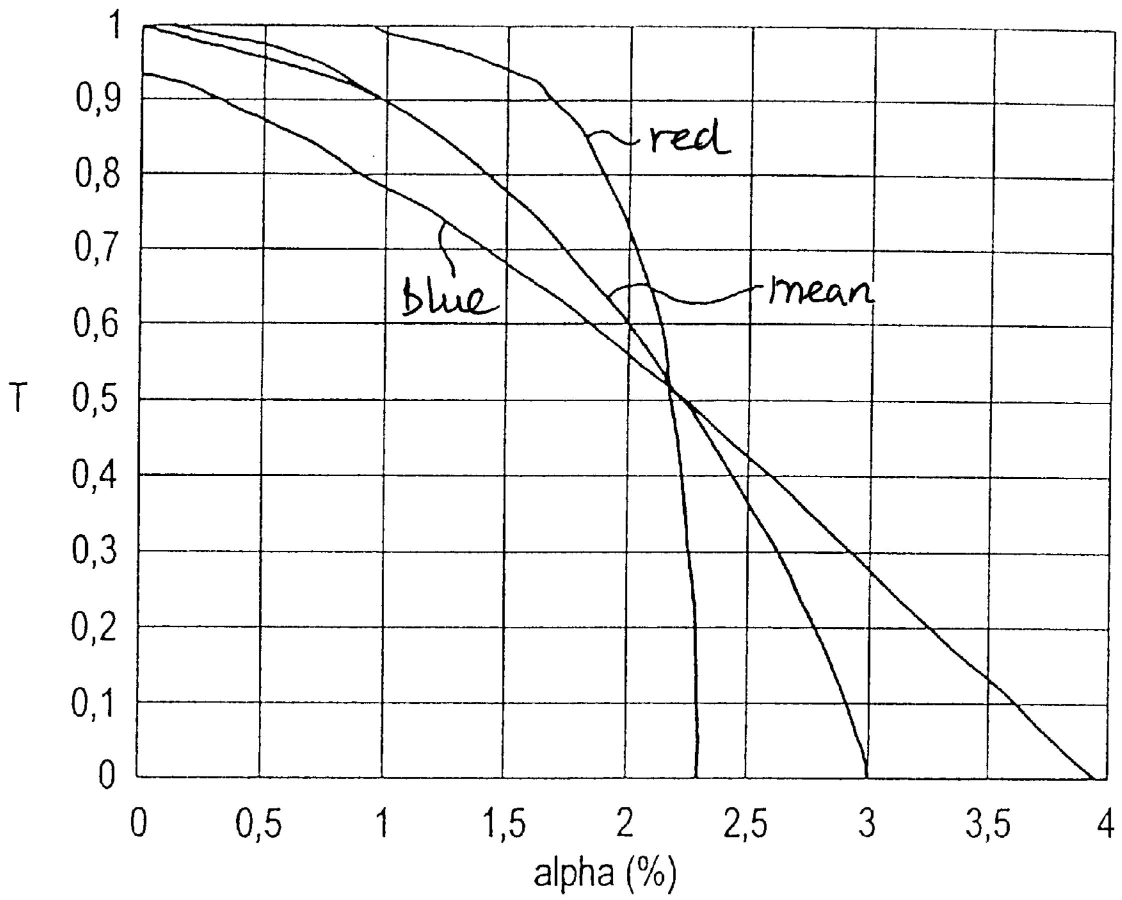
FIG. 16 shows a detailed aspect of the same behaviour as is generally shown in FIG. 15.

It will be understood that this approach enables an increased quantity of light to be passed which is in the vicinity of the point F, and which will then be very close to the driving axis. Thus in FIG. 15, the appearance of the attenuation curve is very different from that in FIG. 12, with attenuation which is first of all limited to the close vicinity of the driving axis (0°). The attenuation is then intensified the more nearly vertical the radiation projected on the road is inclined.

Thus this particular version enables a greater amount of light to be left in close vicinity of the axis of the road, and this leads to greater visual comfort for the driver.

It will be noted here that, in a further version of the embodiment of mask shown in FIG. 14, it can be arranged that the curved edge 43*b* defined by the portion 42*c* of the mask is extended to the free front edge of the mask, so that the portion 42*b* of the mask will then be eliminated. In that case, the said free edge will be either a working edge or inoperative according to the configuration adopted.

Figure 17:
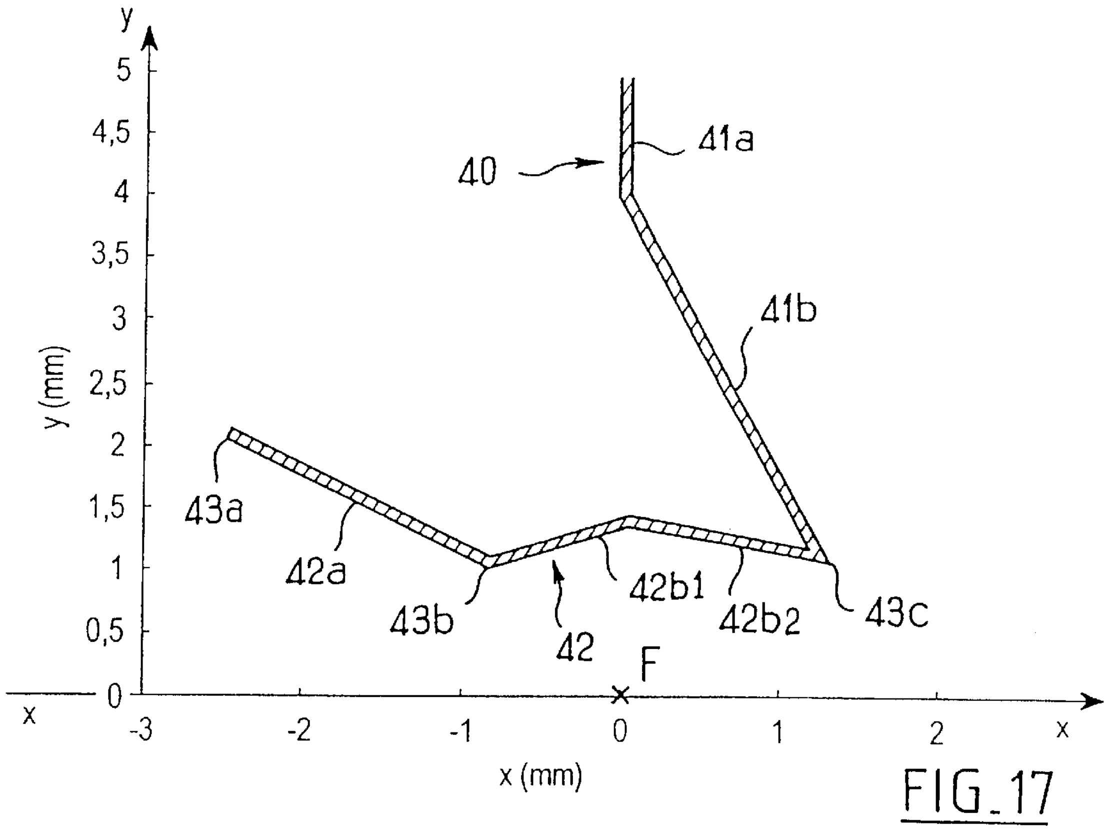
FIG. 17 shows a sixth version of a headlight mask according to the invention.

Reference is now made to FIG. 17 showing the sixth embodiment of mask to be described. This is again similar to the version in FIG. 11, in the sense that the occulting portion 42 has three optically active free edges, 43*a,* 43*b* and 43*c* respectively. The essential difference is that the front edge 43*c* on the one hand is at a height which is close to that of the intermediate edge 43*b* above the optical axis x—x, and secondly, the front edge 43*c* is in front of the position of the focus F on the axis x—x. The purpose of this is to obtain attenuation curves similar to those in FIG. 12 and the subsequent attenuation diagrams, but limiting or preventing at the same time any undesirable coloration of the beam, in particular in its lower region.

It will be noted here that the reverse V-shaped form of the portions 42*b*1 and 42*b*2 which join the edges 43 and 43*c* together has no working function in this case. Those edges could for example be joined by a portion which is straight or in the form of a circular arc concave downwards.

It will be understood that such a mask will give rise to optical behaviour which is somewhere between, on the one hand, those illustrated in FIGS. 5 and 7 (in which the edges 43*b,* 43*c* are disposed in a similar way on either side of the focus F on the axis x—x, and at similar heights), and, on the other hand, that of the embodiment of FIG. 11, in which the rear edge 43*a* is substantially higher than the edge 43*b,* both being behind the focus F.

Figure 18:
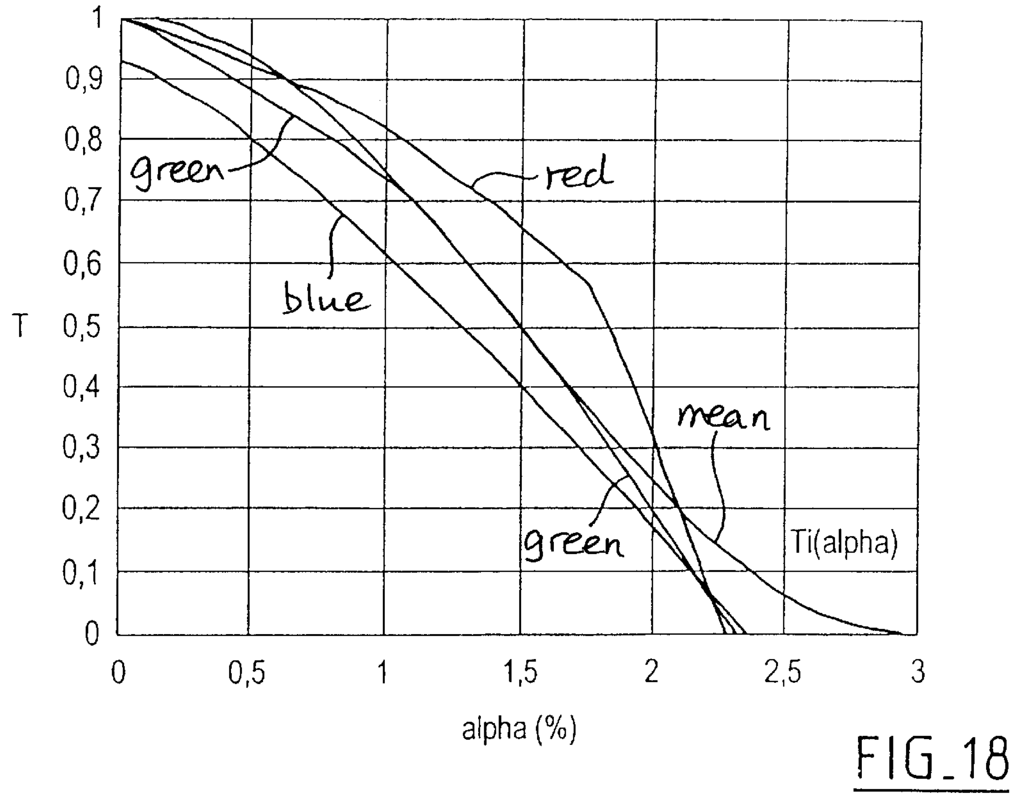
FIG. 18 shows one aspect of the optical behaviour of a headlight having the mask in FIG. 17.

FIG. 18 shows the corresponding attenuation curves, in which it will be seen that a general relationship exists which reinforces the light in close proximity to the driving axis, and at the same time there are close relationships for red, blue and green, so that chromatic effects are substantially reduced.

Figure 19:
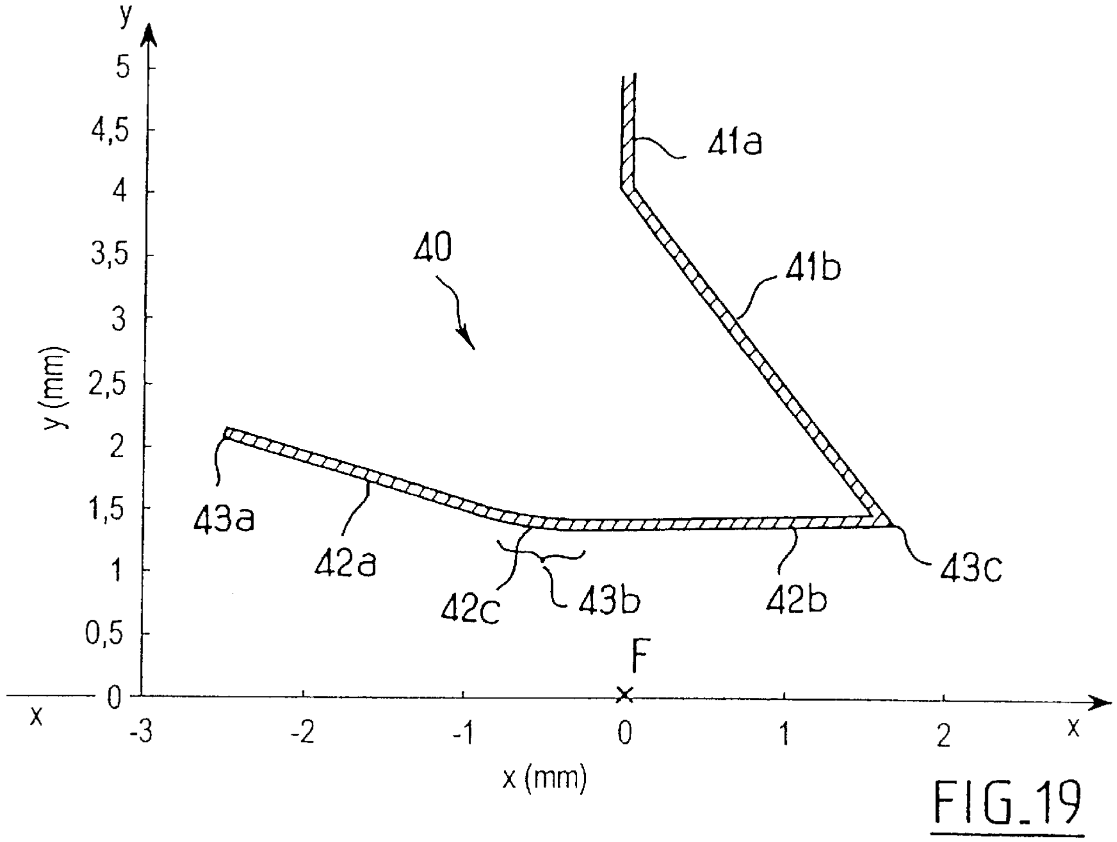
FIG. 19 shows a seventh version of a headlight mask according to the invention.

Reference is now made to FIG. 19 showing a seventh embodiment of the invention, which is an intermediate version between that in FIG. 4 with its rounded edge and the version in FIG. 17 with its arrangement of the various edges. Thus, the occulting portion 42 has a rear edge 43*a,* a front edge 43*c* and a curved intermediate region 42*c* which defines an infinite number of occulting edges 43*c,* according to the inclination of the light passing close to it (see above).

Figure 20:
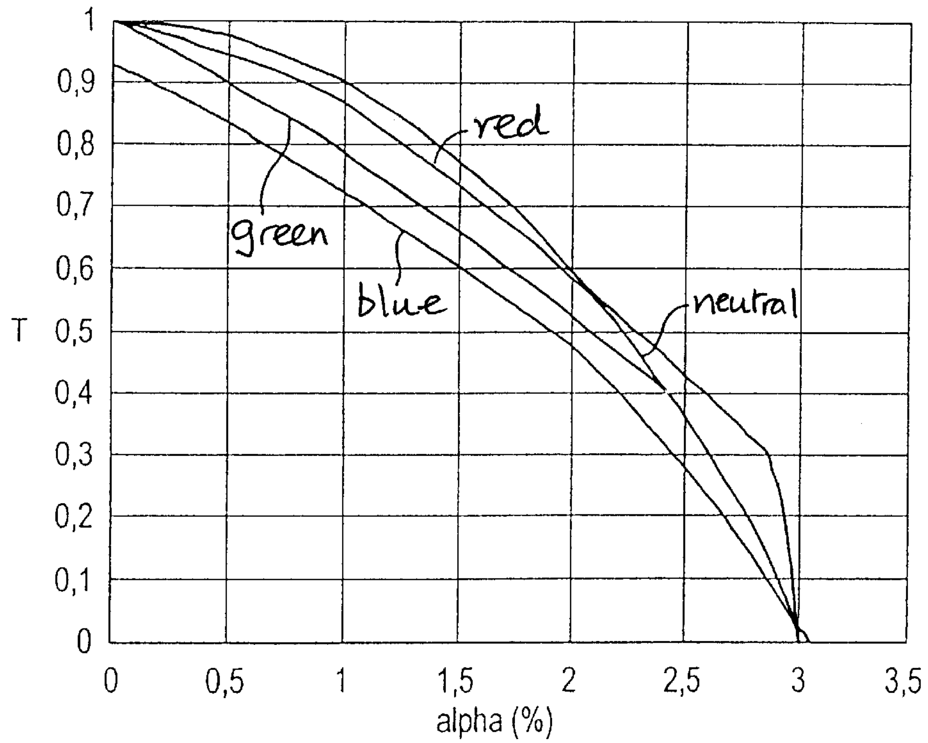
FIG. 20 shows one aspect of the optical behaviour of a headlight having the mask shown in FIG. 19.

The appearance of the attenuation relationship obtained is shown in FIG. 20, which illustrates optical behaviour which is intermediate between those of the masks of FIGS. 14 and 17.

Figure 21:
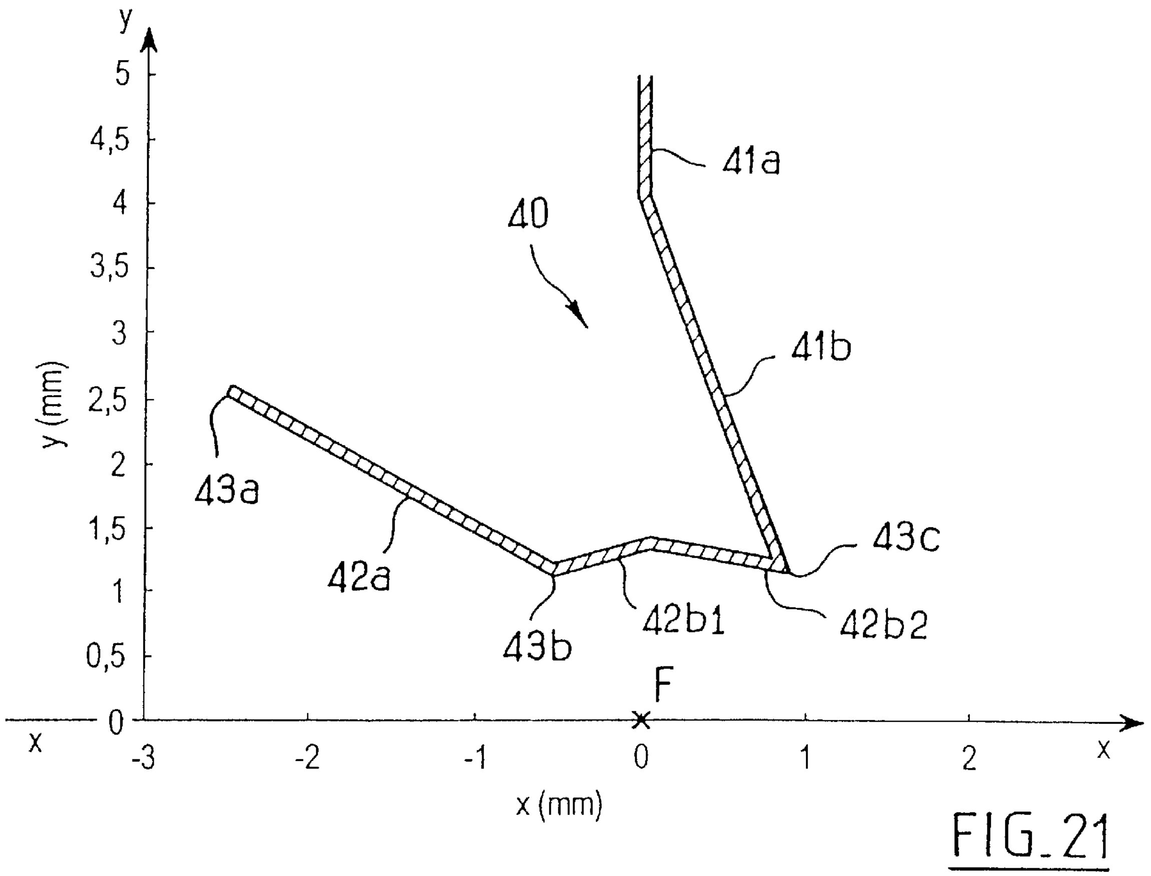
FIG. 21 shows an eighth version of a headlight mask according to the invention.
Figure 22:
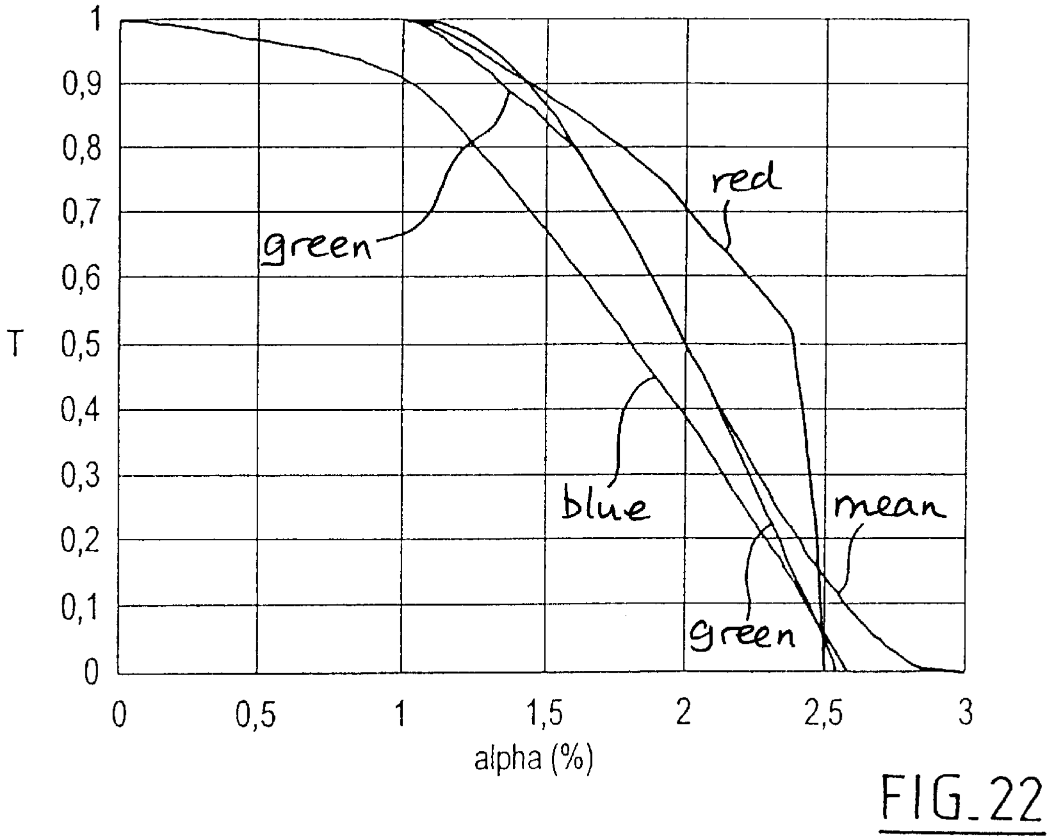
FIG. 22 shows one aspect of the optical behaviour of a headlight having the mask shown in FIG. 21.

Referring now to FIG. 21, this eighth version of the mask according to the invention is similar in principle to the one in FIG. 17, but is dimensioned differently. In particular, and especially because the horizontal distance between the edges 43*b* and 43*c* is shorter than in FIG. 17, the attenuation produced, as shown in FIG. 22, is practically zero up to about 1° below the horizon. This preserves more light still on the optical axis, but it then adopts an appearance which is similar, over a restricted angular range, to that in FIG. 18. This is true for all the shadow lengths, so that in the region of the start of the attenuation, no colouration occurs in the beam.

Figure 23:
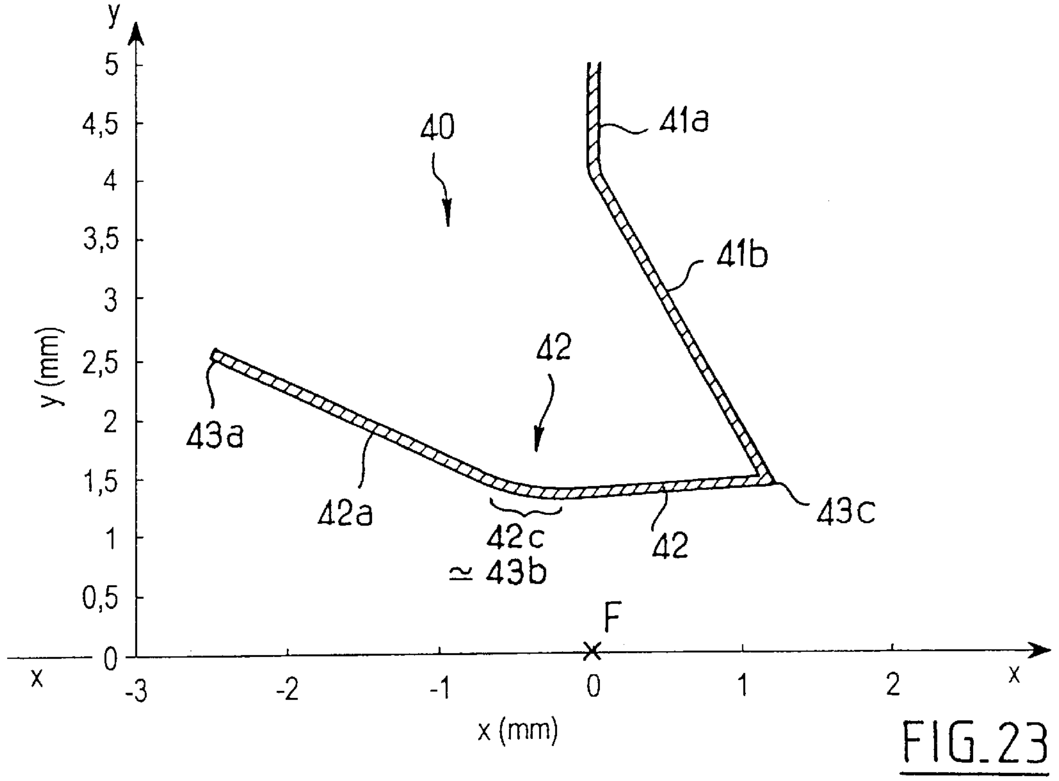
FIG. 23 shows a ninth version of the headlight mask according to the invention.
Figure 24:
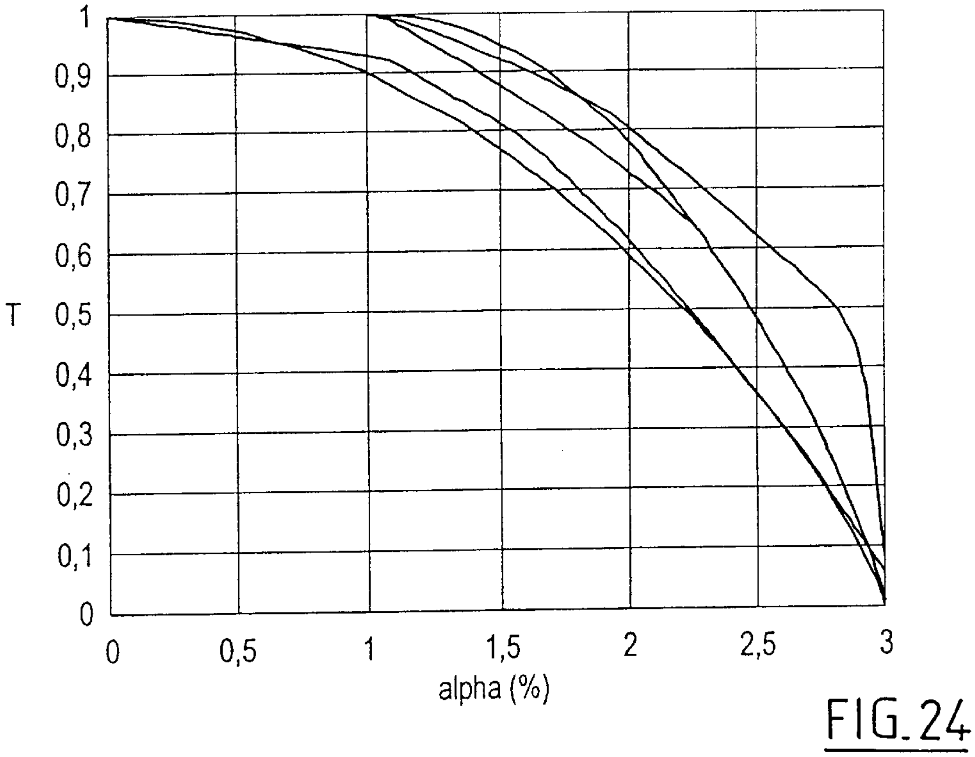
FIG. 24 shows one aspect of the optical behaviour of a headlight equipped with the mask shown in FIG. 23.

Referring now to FIG. 23 showing the ninth embodiment of the invention, this repeats the principle illustrated in FIG. 19, with the essential difference that the portion 42*b* joining the curved intermediate edge 43*b* with the front edge 43*c* is slightly inclined upwards and is shorter than in FIG. 19, while at the same time the portion 42*a* is sharply inclined. The attenuation obtained with this version is shown in FIG. 24.

Figure 25:
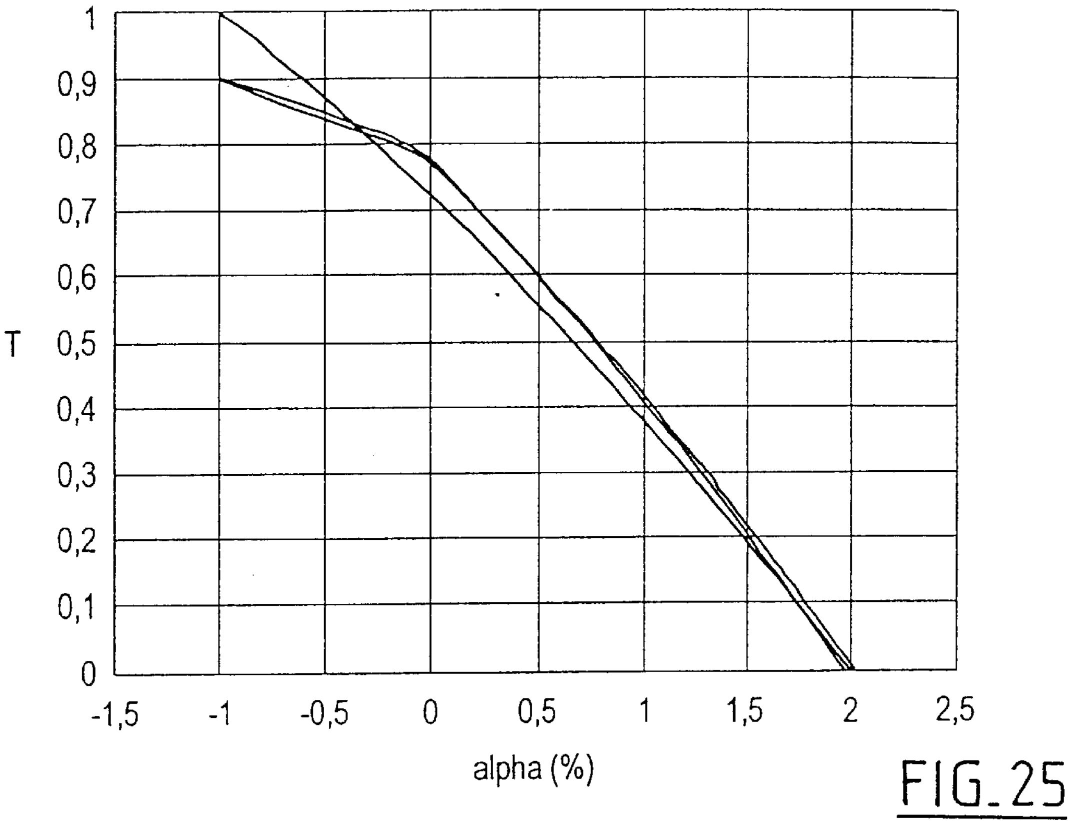
FIGS. 25 and 26 show an aspect of the optical behaviour of headlights having two further modified versions of mask according to the invention, respectively.
Figure 26:
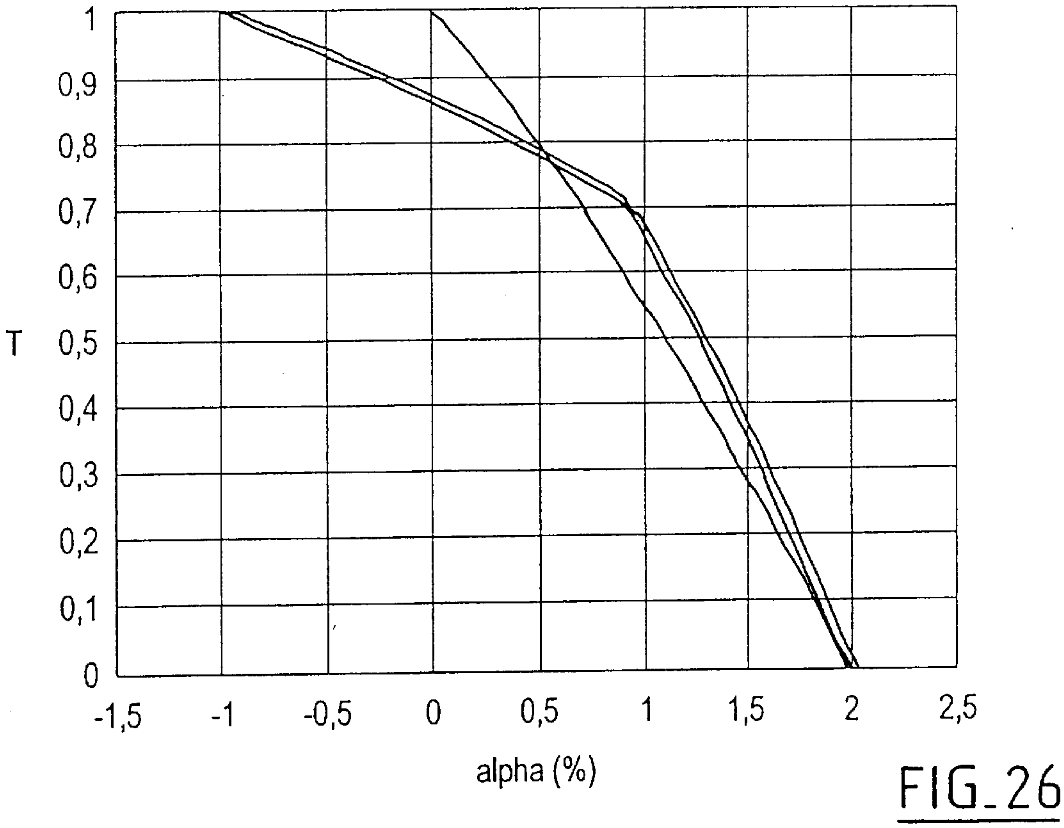

In addition, the mask 40 can be designed in such a way as to give attenuation starting from negative values of inclination of the light (ascending light), especially in the case in which the maximum concentration of the beam in the absence of any mask is not in the axis of the road (0°), but is slightly above it, for example by about 1°. In particular, it is possible to dimension the mask in the form shown in FIG. 5 in such a way as to give attenuation which starts for values of inclination of the light projected on the road of the order of −1°. Some numerical examples of such attenuations are illustrated in FIGS. 25 and 26, to which reference is now made.

For the various examples of masks described above, the Figures showing the masks themselves, i.e. FIG. 3 and the subsequent Figures showing the other eight versions just described, include scales marked in millimeters. The attenuation curves were plotted from the behaviour of masks in the forms precisely indicated by these scales.

In one example, a glass lens 30 is used having a flat inner face and a spherical outer face, with a usable lens radius of 72 mm, a mean focal length of 44 mm, a focal length of 44.5 mm in red and a focal length of 43.5 mm in blue.

The numerical values, as to positions, lengths, angles, radii of curvature and so on, which can be seen marked on the various Figures of the drawings are to be considered as relating to the present description, but are in no way limiting. The person skilled in this technical field can of course naturally adapt these various values, in successive approaches, for lenses having different optical properties.

As regards the manufacture of the mask, the various versions shown in the drawings illustrate that it is in general terms possible to make it by simple bending of a thin metal sheet, such as steel sheet. Any other manufacturing technique and any other material can of course be considered, especially having regard to the degree of precision required and resistance to high temperatures which may exist within the headlight.

In addition, although the foregoing description describes masks all of which have a uniform transverse cross section along their transverse horizontal extent on the axis x—x, it is of course possible to arrange that this cross section can be varied in form, dimensions, position and so on along the mask horizontally and transversely to the axis x—x.

The present invention is of course in no way limited to the embodiments described and shown: the person skilled in this technical field will be able to apply numerous variations and modifications to it. In particular, such a person will be able to combine together the features of the various embodiments of masks which have been described above.

What is claimed is:

1. An elliptical headlight for a motor vehicle, comprising: an ellipsoidal recuperating and concentrating reflector defining a first focal region and a second focal region; a light source in the first focal region; and a convergent lens in front of the reflector, the reflector and lens together defining an optical axis of the headlight, whereby light from the source can be reflected by the reflector to form a patch of concentrated light in the said second focal region, the lens being focused in the vicinity of the second focal region for projecting the said light patch on the road, wherein the headlight further includes a mask disposed between the reflector and the lens for obscuring a part of the light passing between the reflector and the lens, the whole of the mask being above the said second focal region, the mask having two occulting regions spaced apart in the direction of the optical axis, each said occulting region being adapted to obscure a respective part of the light, whereby the said parts of the light are obscured simultaneously.

2. A headlight according to claim 1, wherein each occulting region defines a sharp edge.

3. A headlight according to claim 1, wherein each occulting region defines a curved edge.

4. A headlight according to claim 1, wherein one said occulting region defines a sharp edge and another defines a curved edge.

5. A headlight according to claim 2, wherein both said edges are at the same height.

6. A headlight according to claim 2, wherein the said edges are at different heights.

7. A headlight according to claim 6, wherein the said edges comprise a rear edge and a front edge lower down than the rear edge.

8. A headlight according to claim 2, wherein the lens has a focus, one of the said edges being substantially vertically below the said focus.

9. A headlight according to claim 8, wherein the said edges comprise a front edge and a rear edge, the edge substantially vertically below the said focus being the said front edge.

10. A headlight according to claim 2, wherein the lens has a focus, the said edges being behind and in front of the said focus respectively, in the direction of the optical axis.

11. A headlight according to claim 10, wherein the said edges are substantially equidistant from the said focus in the direction of the optical axis.

12. A headlight according to claim 2, wherein the mask further includes a third occulting region intermediate between the said first and second occulting regions.

13. A headlight according to claim 12, wherein the said intermediate occulting region defines a sharp edge.

14. A headlight according to claim 12, wherein the said intermediate occulting region defines a rounded edge.

15. A headlight according to claim 12, wherein the edge defined by the said intermediate occulting region is at substantially the same height as one of the said first and second occulting regions.

16. A headlight according to claim 12, wherein the edge defined by the said intermediate occulting region is lower down than both of the said first and second occulting regions.

17. A headlight according to claim 1, wherein the mask extends in a general direction which is horizontal and transverse to the optical axis, and has the same vertical cross section over its whole length.

18. A headlight according to claim 1, wherein the mask extends in a general direction which is horizontal and transverse to the optical axis, and has a vertical cross section which varies along its length.

19. A headlight according to claim 1, wherein the mask is made of bent metal plate.

20. A headlight according to claim 1, being an autonomous main beam headlight.

21. A headlight according to claim 1, being a main beam headlight complementary with a dipped beam headlight.

22. An headlight comprising:

an ellipsoidal recuperating and concentrating reflector defining a first focal region and a second focal region;

a light source disposed at about the first focal region of the ellipsoidal reflector;

a convergent lens disposed to receive light from the ellipsoidal reflector; and a mask disposed between the reflector and the lens and capable of obscuring light reflected by the ellipsoidal reflector.

23. A headlight according to claim 22, wherein the mask is disposed entirely above the second focal region.

24. An headlight comprising:

an ellipsoidal recuperating and concentrating reflector defining a first focal region and a second focal region;

a light source disposed to provide light to the ellipsoidal reflector;

a convergent lens disposed to receive light from the ellipsoidal reflector; and a mask disposed between the reflector and the lens and capable of obscuring light reflected by the ellipsoidal reflector, wherein the mask has at least two occulting regions which are spaced apart in the direction of an optical axis defined by the reflector and the lens.

* * * * *